United States Patent [19]

Doane

[11] Patent Number: 4,877,284

[45] Date of Patent: Oct. 31, 1989

[54] DEVICE FOR SUPPORTING OBJECTS ON A VEHICLE DOOR

[76] Inventor: Leland R. Doane, 1786 36th Ave., San Francisco, Calif. 94122

[21] Appl. No.: 276,927

[22] Filed: Nov. 28, 1988

Related U.S. Application Data

[63] Continuation-in-part of Ser. No. 125,947, Nov. 27, 1987, Pat. No. 4,810,026.

[51] Int. Cl.$^4$ ................................................ B60J 9/00
[52] U.S. Cl. ..................................... 296/153; 297/413;
108/46; 224/42.43; 206/558
[58] Field of Search ............................... 296/153, 37.13;
297/194, 412, 413; 108/46, 47, 96; 248/118;
224/148, 42.11, 42.42, 42.43; 206/558

[56] References Cited

U.S. PATENT DOCUMENTS

| | | | |
|---|---|---|---|
| 1,374,907 | 4/1921 | Coforde | 296/153 |
| 1,426,787 | 8/1922 | Spencer | 297/413 |
| 1,695,549 | 12/1928 | Hausler | 296/153 X |
| 1,742,447 | 1/1930 | McKeag | 296/153 |
| 1,760,450 | 8/1928 | Taylor | 296/153 |
| 1,873,414 | 8/1932 | Jarvis | 297/413 |
| 1,964,500 | 6/1934 | Breiding et al. | 108/46 |
| 1,984,855 | 12/1934 | Zwierzina | 296/153 X |
| 2,246,432 | 6/1941 | Cohen | 108/47 |
| 2,569,436 | 10/1951 | Allen, Sr. | 296/153 |
| 2,577,561 | 12/1951 | Atwater | 296/153 |
| 2,789,862 | 4/1957 | Boyer | 296/153 |
| 2,933,358 | 4/1960 | Sheble et al. | 108/46 |
| 3,037,639 | 6/1962 | Kost | 108/47 X |
| 3,110,397 | 11/1963 | Peck et al. | 224/42.42 |
| 3,118,704 | 1/1964 | Meserve | 312/235 A |
| 3,603,637 | 9/1971 | DePinto | 296/153 |
| 4,592,584 | 6/1986 | White, Jr. | 296/153 |
| 4,730,760 | 3/1988 | Keller | 224/148 |

FOREIGN PATENT DOCUMENTS

| | | | |
|---|---|---|---|
| 1115669 | 1/1982 | Canada | 224/42.42 |
| 1016138 | 11/1952 | France | 296/153 |

*Primary Examiner*—Dennis H. Pedder
*Attorney, Agent, or Firm*—Thomas R. Lampe; Glen R. Grunewald

[57] ABSTRACT

A device for supporting objects on a vehicle door and including two support elements disposed at different levels connected by a connector element extending diagonally downwardly from the upper support element to the lower support element.

6 Claims, 1 Drawing Sheet

U.S. Patent  Oct. 31, 1989  4,877,284
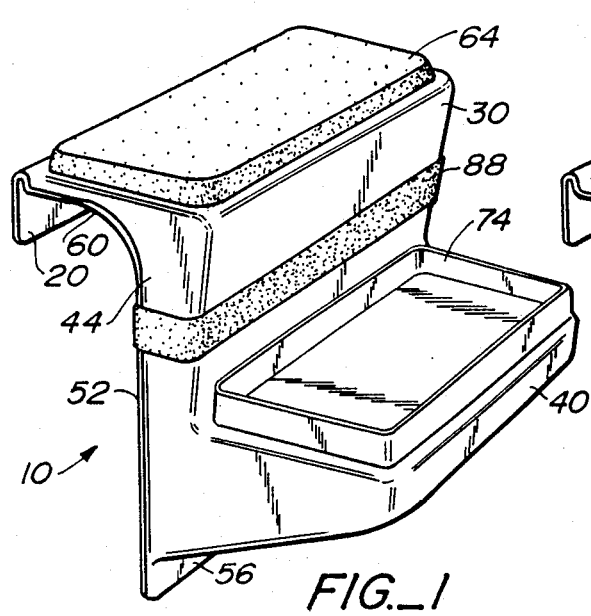
FIG._1
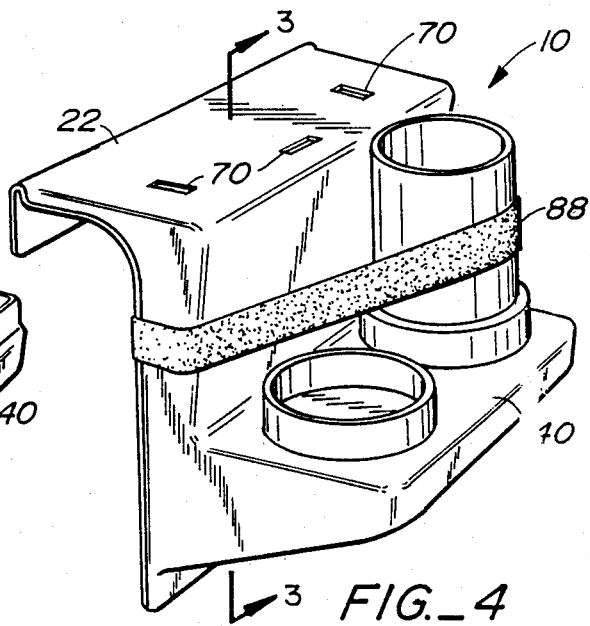
FIG._4
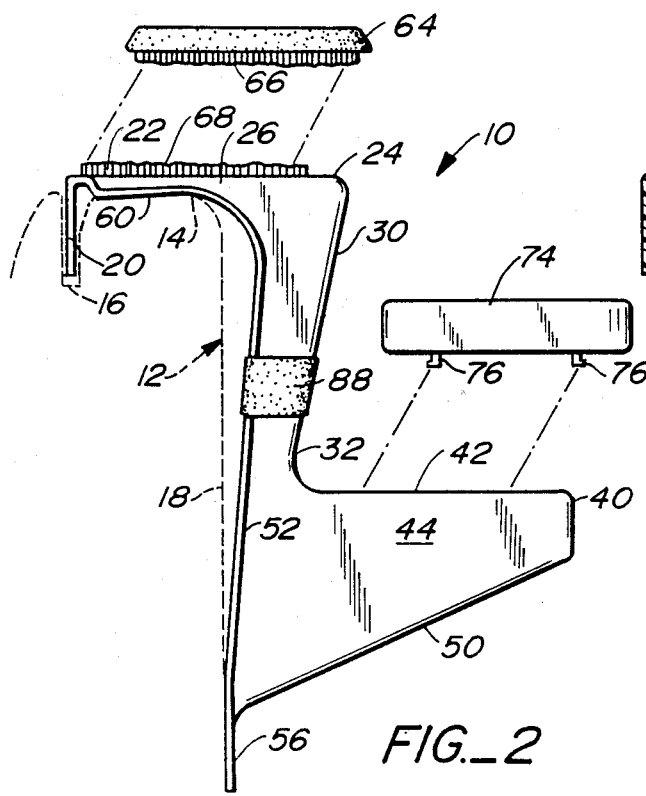
FIG._2
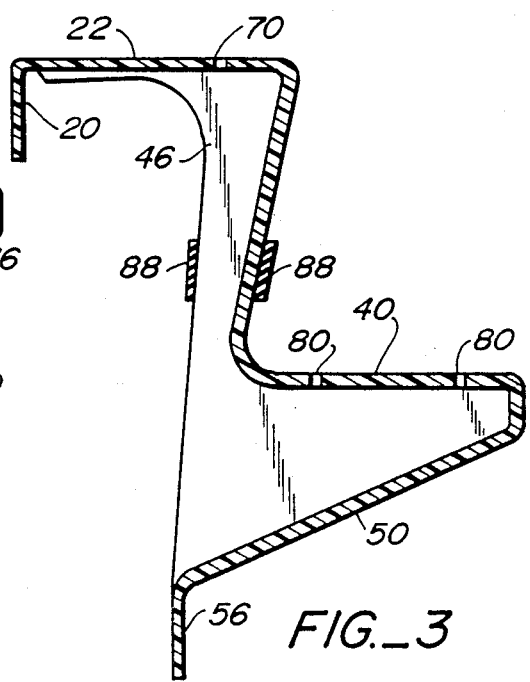
FIG._3

DEVICE FOR SUPPORTING OBJECTS ON A VEHICLE DOOR

This is a continuation-in-part of application Ser. No. 07/125,947, filed Nov. 27, 1987 now U.S. Pat. No. 4,810,026.

TECHNICAL FIELD

The present invention relates to a device for supporting objects on a vehicle door. The device also has application as an arm rest for use by the occupant of a vehicle.

BACKGROUND ART

The above-identified application U.S. Ser. No. 07/125,947 relates to an arm rest construction which allows the driver or other vehicle occupant to position his or her arm at more than one level on the arm rest without making any adjustments to the device. Such arm rest remedies the deficiencies of a wide variety of arm rest constructions known in the prior art. Representative of these prior art arm rests are those shown in U.S. Pat. Nos. 1,695,549; 1,715,862; 1,760,450; 1,873,414; 1,984,855; 2,569,436; 2,577,561; 3,603,637 and 4,592,584 . Cited during prosecution of the aforesaid patent application are the following U.S. Pat. Nos: 1,426,787; 3,118,704; 2,789,862; 3,037,639; 1,742,447; 1,374,907 and 1,964,500.

DISCLOSURE OF THE INVENTION

The device of the present invention constitutes an improvement of the device disclosed in the above-identified patent application as well as a step forward in the art as compared with the arm rests disclosed in the above-identified patents.

More particularly, the device of the present invention is of a highly stable, inexpensive construction. Not only is it characterized by substantial structural strength, the device incorporates several features which allow the device to be utilized for a number of different applications. The device is not only capable of being utilized as an arm rest, but as a holder for objects.

The device of the present invention is adapted for use with a vehicle door, said vehicle door having a sill defining a slot and door panel disposed below the sill.

The device includes a downwardly extending projection positionable within the slot. A first support element is connected to the projection and adapted to extend away from the slot and over and beyond the sill to a first location spaced from the slot. The first support element defines a first support surface.

A connector element is attached to the first support element at the first location and extends diagonally downwardly therefrom, the connector element being adapted to extend downwardly along the door panel and toward the door panel. The connector element has a distal end disposed below the first support element.

The device also includes a second support element attached to the connector element at a second location spaced from the first support element and defining a second support surface. The second support element is adapted to extend away from the door panel and the first and second support surfaces are each of a size and configuration to support objects on the vehicle door at different levels.

The device additionally includes a unique side wall and flange construction which not only provides structural strength but also helps protect the vehicle door from scratching or other damage when the device is placed thereon and is supported thereby. Finally, the device incorporates several features which specifically lend themselves to either the holding of objects by the device or usage as an arm rest, whichever is desired.

Other features, advantages, and objects of the present invention will become apparent with reference to the following detailed description and accompanying drawings.

BRIEF DESCRIPTION OF THE DRAWINGS

FIG. 1 is a perspective view of a preferred form of support device constructed in accordance with the teachings of the present invention;

FIG. 2 is an exploded, side view of the device of FIG. 1;

FIG. 3 is a cross-sectional view of the device taken along line 3—3 of FIG. 1, but without the pad and receptacle illustrated in FIG. 1; and FIG. 4 is a perspective view of the device illustrating its use as a holder.

BEST MODE FOR CARRYING OUT THE INVENTION

Referring now to FIGS. 1, 2, and 3, a device constructed in accordance with the teachings of the present invention is designated generally by reference numeral 10. The device is for the purpose of supporting objects on a vehicle door. In the disclosed embodiment, device 10 is of unitary, molded plastic construction and of generally uniform width. In FIG. 2 there is a phantom line representation of a portion 12 of a vehicle door. As is conventional, the vehicle door includes a window sill 14 defining a slot 16, and a door panel 18.

Device 10 includes a downwardly-extending projection 20 positionable within slot 16. A first support element 22 is connected to projection 20 and is adapted to extend away from the slot 16 and over sill 14 to a first location 24 spaced from the slot. The first support element 22 defines a first support surface 26.

A connector element 30 is attached to the first support element at the first location and the connector element extends obliquely downwardly therefrom. The connector element is adapted to extend downwardly along the door panel and toward the door element, said connector panel having a distal end 32 disposed below the first support element.

A second support element 40 is attached to the connector element 30 at a second location, namely the distal end 32 of the connector element, spaced from the first support element. Second support element 40 defines a second support surface 42. Because the connector element extends obliquely downwardly and inwardly it allows the second support element to provide a relatively large second support surface without undue intrusion into the vehicle interior. Second support element 42 is adapted to extend away from the door panel 18 and the first and second support surfaces are each of a size and configuration to support objects on the vehicle door at different levels.

Device 10 additionally comprises side walls 44, 46 attached to connector element 30. Side walls 44, 46 are adapted to extend toward the door panel when projection 20 is disposed in slot 16. The side walls flare slightly away from each other in such direction so that a plurality of devices 10 can be nested when not in use. Side walls 44, 46 are also attached to, and extend along, spaced ends of second support element 40. The side walls 44, 46 extend all the way, as shown, to a bottom wall 50. The side walls each decrease in width in a downward direction in the immediate vicinity of the connector element.

Flanges 52 (only one of which is shown) project generally perpendicularly from the side walls 44, 46. The flanges 52 are spaced from the connector element 30 and second support element 40. A lip 56 projects downwardly from the bottom wall of second support element 42. The lip runs along the length of the bottom wall 50 and interconnects flanges 52 at the bottom of device 10. The flanges, side walls, and lip cooperate to provide a structure characterized by high strength and stability.

Each flange 52 has a segment 60 extending generally parallel to the first support surface 26. The flange segment 60 is adapted to engage sill 14 when the projection 20 is in slot 16. At the same time, lip 56 engages door panel 18, the corner formed by the sill and the door panel essentially acting as a fulcrum about which device 10 pivots when the device is positioned on the door. Flanges 52 (including flange segments 60) and the lip 56 of the device present a much broader area of contact between the device and the door than would be the case without such elements and this obviously helps protect the door from damage that might occur in the absence of such elements.

The device 10 is capable of a number of different uses. For example, one or both of the support surfaces may be used as arm rests. Device 10 in FIG. 1 has a pad 64 resting upon the first support surface of first support element 22. This may be used by a driver or other occupant of the vehicle to support an arm. The pad 64 may be of any suitable construction such as being constructed of a foam or solid interior and a surrounding cover of plastic, fabric or the like. The pad may be releasably secured to the first support surface 26 by strips of synthetic materials 66, 68 which adhere when pressed together and are sold under the trademark "Velcro". Apertures 70 (see FIG. 3) are formed in first support element 22. The apertures 70 may be used to receive mounting pins applied to a support pad if such alternative means of removable attachment is desired. Because such pins are well known in the art, they have not been illustrated. It should be noted that the apertures 70 are located away from sill 14 so tht the sill will not interfere with the pins.

In FIG. 1 a tray member or receptacle 74 is removably attached to second support element 40. As may be seen in FIG. 2, the receptacle 74 has prongs or pins 76 projecting from the bottom thereof. Pins 76 are of a suitable size and configuration enabling them to be frictionally received within apertures 80 formed in second support element 40. Of course, as stated above, such a pin and aperture arrangement may be utilized to secure an arm rest pad to the second support surface rather than, or in addition to, securing such a pad to the upper or first support element.

FIG. 4 shows the device 10 with nothing disposed upon the first support element 22 thereof. The second support element 40, on the other hand, supports two hollow ring members which may be attached thereto by a pin-aperture combination, Velcro strips, or any other suitable expedient. One of said ring members is illustrated as accommodating a drinking glass Such rings could, of course, also function as receptacles for coins and other objects.

To provide additional stability for objects being held thereby device 10 incorporates a resilient strap 88 wrapped around the connector element 30, as shown, and adapted to releasably secure any desired object between the strap and the connector element.

What is claimed is:

1. A device for supporting objects on a vehicle door having a sill defining a slot and a door panel disposed below said sill, said device comprising:
   a downwardly extending projection positionable within said slot;
   a first support element connected to said projection and adapted to extend away from said slot and over and beyond said sill to a first location spaced from said slot, said first support element defining a first support surface;
   a connector element attached to said first support element at said first location and extending obliquely downwardly therefrom, said connector element adapted to extend downwardly along said door panel and toward said door panel, said connector element having a distal end disposed below said first support element;
   a second support element defining a second support surface, said second support element being attached to said connector element at a second location spaced from said first support element, said second support element adapted to extend away from said door panel, and said first and second support surfaces each being of a size and configuration to support objects on said vehicle door at different levels; and
   spaced side walls attached to said connector element, said side walls adapted to extend toward said door panel when said projection is in said slot.

2. The device according to claim 2 wherein said side walls are also attached to said second support element.

3. The device of Claim 2 wherein a flange projects generally perpendicularly from each of said side walls, said flanges being spaced from said connector element and said second support element.

4. The device of claim 3 additionally comprising a lip projecting downwardly from said second support element, said lip interconnecting said flanges at the bottom of said device.

5. The device of claim 1 wherein said side walls each decrease in width in a downward direction in the immediate vicinity of said connector element.

6. The device according to claim 3 wherein said flanges each include a flange segment extending generally parallel to said first support surface and adapted to engage said sill when said projection is in said slot.

* * * * *